US012123099B2

(12) United States Patent
Segaert et al.

(10) Patent No.: US 12,123,099 B2
(45) Date of Patent: Oct. 22, 2024

(54) METHOD FOR MANUFACTURING STRUCTURED PRESS ELEMENTS

(71) Applicant: FLOORING INDUSTRIES LIMITED, SARL, Bertrange (LU)

(72) Inventors: Martin Segaert, Ypres (BE); Christophe Maesen, Lichtervelde (BE); Dries Brouckaert, Gullegem (BE)

(73) Assignee: UNILIN BV, Wielsbeke (BE)

(*) Notice: Subject to any disclaimer, the term of this patent is extended or adjusted under 35 U.S.C. 154(b) by 0 days.

(21) Appl. No.: 18/306,688

(22) Filed: Apr. 25, 2023

(65) Prior Publication Data

US 2023/0257886 A1 Aug. 17, 2023

Related U.S. Application Data

(63) Continuation of application No. 16/651,576, filed as application No. PCT/IB2018/057457 on Sep. 26, 2018, now Pat. No. 11,680,324.

(30) Foreign Application Priority Data

Sep. 28, 2017 (BE) .................................. 2017/5690

(51) Int. Cl.

| | |
|---|---|
| ***C23F 1/02*** | (2006.01) |
| ***B44B 5/02*** | (2006.01) |
| ***C23F 1/16*** | (2006.01) |
| *B44C 1/24* | (2006.01) |
| *B44C 5/04* | (2006.01) |

(52) U.S. Cl.

CPC ................ *C23F 1/02* (2013.01); *B44B 5/026* (2013.01); *C23F 1/16* (2013.01); *B44C 1/24* (2013.01); *B44C 5/04* (2013.01)

(58) Field of Classification Search

CPC ... C23F 1/02; C23F 1/16; B44B 5/026; B44C 1/24; B44C 5/04

USPC .......................................................... 216/49

See application file for complete search history.

(56) References Cited

U.S. PATENT DOCUMENTS

| | | | | |
|---|---|---|---|---|
| 2,367,715 | A * | 1/1945 | Chapman | B21D 51/28 266/115 |
| 2,612,682 | A | 10/1952 | Burrack | |
| 4,269,679 | A | 5/1981 | Moura | |
| 5,783,790 | A | 7/1998 | Mitsumori et al. | |
| 5,858,106 | A * | 1/1999 | Ohmi | B08B 3/12 134/28 |
| 6,833,063 | B2 | 12/2004 | Basol | |
| 9,529,264 | B2 | 12/2016 | Reichert | |
| 10,507,475 | B2 | 12/2019 | Reichert | |
| 11,680,324 | B2 * | 6/2023 | Segaert | C23F 1/02 216/49 |
| 2002/0170878 | A1 | 11/2002 | Wang et al. | |
| 2003/0213772 | A9 | 11/2003 | Mok et al. | |
| 2010/0006542 | A1 | 1/2010 | Reichert | |
| 2011/0217455 | A1 | 9/2011 | Veerasamy | |
| 2017/0065989 | A1 | 3/2017 | Reichert | |
| 2017/0190955 | A1 | 7/2017 | Mahmoud et al. | |

FOREIGN PATENT DOCUMENTS

| | | | |
|---|---|---|---|
| DE | 2936207 | A1 | 8/1980 |
| DE | 10124710 | A1 | 11/2002 |
| EP | 1987395 | A1 | 11/2008 |
| EP | 2123476 | A2 | 11/2009 |
| EP | 2251193 | A1 | 11/2010 |
| EP | 2834076 | A2 | 2/2015 |
| WO | 0111426 | A1 | 2/2001 |
| WO | 0117794 | A1 | 3/2001 |
| WO | 0196689 | A1 | 12/2001 |
| WO | 2006031079 | A1 | 3/2006 |
| WO | 2006066776 | A2 | 6/2006 |
| WO | 2007147376 | A1 | 12/2007 |
| WO | 2012085849 | A2 | 6/2012 |
| WO | 2014115086 | A2 | 7/2014 |
| WO | 2017046424 | A2 | 3/2017 |

OTHER PUBLICATIONS

Belgian Search Report and Written Opinion of Application No. BE201705690, Jun. 5, 2018.

International Search Report and Written Opinion of International Application No. PCT/IB2018/057457, Mar. 14, 2019.

* cited by examiner

*Primary Examiner* — Duy Vu N Deo

(74) *Attorney, Agent, or Firm* — Workman Nydegger

(57) ABSTRACT

A method for manufacturing structured press elements comprises at least the following steps: the step of providing an element of metal; the step of providing a mask on a surface of the element for shielding portions of the surface; the step of treating non-shielded portions of the surface of the element; the step of removing the mask; wherein the method comprises at least a step in which the surface of the element is subjected to an ultrasonic treatment and/or that the step of providing the mask comprises at least a treatment with infrared radiation and/or that the step of chemically treating is performed with the surface directed downward.

19 Claims, No Drawings

METHOD FOR MANUFACTURING STRUCTURED PRESS ELEMENTS

BACKGROUND

Field of the Disclosure

This invention relates to a method for manufacturing structured press elements, which can be employed when manufacturing coated decorative panels.

More particularly, the invention relates to the manufacture of press elements which are employed in a method for manufacturing coated panels, wherein the coated panels are of the type which comprises a substrate and a provided thereon decorative top layer. Herein, this may relate, for example, to floor panels which substantially consist of a substrate, for example, an MDF or HDF (Medium or High Density Fiberboard) panel and a provided thereon top layer, such as a laminate top layer.

In particular, the invention relates to press elements which are applied in a method for manufacturing coated panels with a printed decor with a transparent or translucent synthetic material layer extending there above. It is known that such decor, whether or not by the intermediary of primer layers, can be printed directly on the substrate. However, the decor may also be provided on a material sheet, such as a paper sheet or a plastic foil, which is incorporated in said top layer. The transparent or translucent synthetic material layer forms a protective layer above the printed decor and may comprise, for example, wear-resistant particles, such as aluminum oxide. It is not excluded that this protective layer also comprises a material sheet, such as a paper sheet or plastic foil. This may relate, for example, to the manufacture of laminate floor panels, for example, according to a DPL (Direct Pressure Laminate) or HPL (High Pressure Laminate) technique. In the case of a DPL technique, one or more material sheets, provided with resin, are brought together with a substrate in a press device, where they, by means of a press element and under the influence of increased pressure and temperature, are connected to each other as well as to the substrate. In the case of an HPL technique, the top layer is formed separately, on the basis of two of more material sheets provided with resin, before the thus obtained top layer is provided on the substrate, for example, by gluing it onto the substrate. According to another possibility, this may relate to the manufacture of synthetic material-based floor panels or floor coverings, such as, for example, vinyl panels, vinyl coverings and the like.

It is known, for example, from WO 01/96689 or WO 2014/115086, that at the surface or the decor side of such coated panels a relief of embossed portions can be formed, by which, for example, the natural structure of the motif represented in said decor can be imitated. So, for example, in the case that the decor represents a wood motif, a relief can be used which imitates a wood structure. Such wood structure may possibly be in correspondence with the underlying decor, with which then so-called embossments in register with the printed decor are obtained.

For realizing a relief at the decor side, structured press elements are applied, such as known. For manufacturing such press elements, various techniques are known, for example, from WO 2006/066776, EP 2 123 476, EP 2 251 193, EP 1 987 395 and EP 2 834 076. From EP '395, a method is known for manufacturing structured press elements, wherein the method comprises at least the following steps:

- the step of providing an element of metal;

- the step of providing a mask on a surface of the element for shielding portions of said surface;
- the step of chemically treating non-shielded portions of said surface of the element; and the step of removing said mask.

The press elements which are obtained by means of the methods of the state of the art still leave much to be desired, in particular when they are applied for realizing relatively deep structure portions in the surface of the respective press element, for example, with structure portions having a depth larger than 0.15 millimeters.

SUMMARY OF THE DISCLOSURE

The present invention aims at an alternative method for manufacturing press elements, which, according to various preferred embodiments of the invention, can offer advantages in respect to the state of the art.

To this aim, the present invention, according to its first independent aspect, relates to a method for manufacturing structured press elements, wherein the method comprises at least the following steps:

- the step of providing an element of metal;
- the step of providing a mask on a surface of the element for shielding portions of said surface;
- the step of treating, preferably chemically treating, such as etching, non-shielded portions of said surface of the element;
- the step of removing said mask;

with the characteristic that the method comprises at least a step wherein said surface of the element is subjected to an ultrasonic treatment. It is clear that the respective mask, at least to a certain extent, is resistant to the subsequent step of the treatment, such that substantially the non-shielded portions are treated.

The ultrasonic treatment preferably takes place in a bath, wherein said element or anyhow at least said surface is immersed in a liquid. The ultrasonic waves which are directed through the respective liquid lead to air bubbles, which implode against the surface to be treated. In this manner, a particularly effective treatment of the respective surface is obtained, wherein the imploding air bubbles also have a mechanical effect on the surface. Preferably, the liquid relates to a degreasing agent, such as an alkaline degreasing agent. The ultrasonic treatment applied according to the invention primarily is directed to cleaning or degreasing the respective surface, however, other effects, such as a surface treatment for obtaining a certain mattness or gloss, are not excluded. The applied frequency range of the ultrasonic treatment preferably lies between 20 and 100 kHz, and still better between 25 and 50 kHz. An ultrasonic treatment with a frequency in the lower range, for example, from 20 to 30 kHz, or approximately 25 kHz, leads to a strong treatment of the surface, whereas an ultrasonic treatment at the higher frequencies, for example, between 40 and 50 kHz, or approximately 45 kHz, leads to a finer treatment of the surface.

In a step following to said ultrasonic treatment, whether or not in a bath, the press element, or anyhow at least the treated surface, preferably is rinsed once or several times, for example, with water, hard water or a degreasing agent. Preferably, hard water is used for rinsing. Hereby, a very efficient cleaning is obtained. Preferably, the hard water comprises a concentration of minerals of more than 40 mg per liter, or still better more than 60 or more than 80 mg/l.

According to the invention, the ultrasonic treatment can be employed in various manners, of which herein below two preferred possibilities are described.

According to a first possibility, the step of removing said mask comprises said ultrasonic treatment. By means of an ultrasonic treatment, it is possible to remove hard masks more efficiently and smoothly. With deep structure portions, a very good cleaning and/or degreasing is obtained. In particular when applying the treatment with the respective surface immersed in a liquid, the effect of the imploding bubbles leads to a very efficient breaking up of the mask. It is noted that the application of hard masks is particularly advantageous when manufacturing press elements with deep structure portions, for example, deeper than 0.15 mm, as in such cases the mask is exposed to the respective treatment, for example, an etching treatment, for a prolonged period. It is clear that the ultrasonic treatment of the invention is also efficient for the removal of softer masks, which can be employed, for example, in the case that said treatment is a blast treatment.

According to a second possibility, the method further also comprises the step of pre-treating said surface prior to providing said mask, wherein the step of pre-treating comprises said ultrasonic treatment. The inventors have found that such pre-treatment leads to an improved adherence of the mask on the respective surface. Preferably, a surface tension is obtained of 48 mN/m or more, for example, between 50 and 60 mN/m, such as 52 to 54 mN/m. This improved adherence and increased surface tension may be due, on the one hand, to the removal of impurities from the surface, and, on the other hand, to the restricted relief obtained by the mechanical impact of imploding bubbles, when the treatment is performed in a bath. An improved adherence is interesting with masks which are exposed to the subsequent step of the treatment for a prolonged period, for example, in the case of realizing deep structure portions, for example, when realizing structure portions with a depth of more than 0.15 mm. It is evident that an improved adherence by the removal of impurities is also of interest with less deep structures, such as with structure depths of several hundredths of millimeters, for example, a depth of 0.02 mm, or with polished surfaces, as in such cases the mechanical adherence is minimal.

Of course, it is not excluded that in the method of the invention a plurality of ultrasonic treatments of the respective surface may be performed, for example, at least a treatment according to the above-mentioned first possibility and at least a treatment according to the above-mentioned second possibility.

From the above, it is clear that the method of the invention preferably is employed for manufacturing press elements which comprise structure portions with a depth of 0.15 mm or more, or even of 0.4 mm or more. Preferably, said press element, when removing said mask, shows structure portions with a depth of 0.15 mm or more. Preferably, structure portions with a depth of 0.15 mm or more are realized in said step of treatment, by which is meant that during this step material is removed over a depth of 0.15 mm or more.

The element of metal from which is started can be realized in various manners, of which herein below some possibilities are listed.

According to a first possibility, the element is a flat element of metal, preferably of steel, namely a steel plate. Such element can have a global thickness of 1.5 to 10 mm. The element from which is started can have a flat surface to be treated. For example, this may relate to a surface which has been ground. According to a variant, the element from which is started may comprise a surface to be treated, which is already pre-formed, for example, by means of a milling and/or laser treatment.

According to a second possibility, the element is a roller or drum, the surface of which consists at least of metal, for example, of copper. In this second possibility, too, the casing of the roller or drum can be realized flat or pre-formed.

According to a third possibility, the element is a metal, for example, steel, band which may or may not be already attached with the ends to each other for forming and endless band. In this third possibility, too, the finally outward-directed surface of the endless band can be realized flat or pre-formed.

Preferably, the step of providing the mask is performed by means of a digital printing technique directly on the surface of said element, preferably by means of an inkjet technique. So, for example, a printing technique similar to that of EP 1 987 395 can be applied. A digital printing technique allows in a simple manner providing flat and not flat elements, whether or not pre-formed, with a mask.

Preferably, said mask is composed of an acrylate-containing or acrylate-based material. Acrylates lead to a significantly harder mask than, for example, UV-cured gel, wax or paraffin layers, which, according to the state of the art, for example, in WO 2006/066776, are applied for realizing etching masks. The initial adherence and the obtainable resolution of such mask also is better, such that sharper structure portions can be obtained in the step of treating. Moreover, such masks are resistant against a broader spectrum of treatments, including an etching treatment by means of $FeCl_3$, a sandblast treatment, electro polishing, glass blasting and so on. Preferably, in the case of a mask provided by means of a digital printing technique, the substance to be provided for constructing the mask comprises, for 10 to 60 percent by weight, preferably at least 20%, of acrylates and preferably further also for 10 to 60% of a reactively solubilizing monomer and/or adherence promoter, such as morfoline, for example, acryloyl morfoline. Of course, the substance to be applied can also comprise other components. Independently of the fact whether it contains acrylates or not, the substance preferably is UV-curable, namely by means of ultraviolet radiation, or EB-curable, namely by means of electron beams. So, for example, the substance, immediately after printing it, can already be at least partially cured by means of one or more UV sources or EB sources situated in the immediate vicinity of the print heads, for example, are mounted on these print heads. This so-called "pin-cure" leads to an optimum initial adherence of the respective mask parts and a high resolution. The inventors further found that an acrylate-containing, whether or not UV- or EB-curable, substance also can be cured further or completely by means of IR radiation, namely by means of infrared radiation. Preferably, a mask, which is already cured by means of UV or EB pin-cure, is subjected to another, further curing by means of IR radiation. Such manner of working leads to extremely hard and stable masks.

It is evident that within the scope of the invention also use can be made of a mask composed of gel, wax, hot-melt glue or paraffin. Preferably, in this case this also relates to a UV-cured substance, such as an UV-curing wax or hot-melt glue.

As stated several times already, the invention is in particular of interest when press elements with deep structure portions, for example, with a depth of more than 0.15 mm or even of 0.4 mm or more, have to be realized, wherein this depth preferably is reached during the step of treating the non-shielded parts. Hereby, in other words, is meant that during the step of treating material is removed over a depth of more than 0.15 mm, more than 0.4 mm, respectively. The ultrasonic treatment allows working with harder, and thus more resistant, masks, by which a broader spectrum of processing techniques can be applied and/or a longer exposure to these processing techniques can be applied.

The treatment performed on the relevant surface of the element during the step of treating preferably comprises an etching treatment and/or a blast treatment, such as a sand or glass blast treatment. In the etching treatment, preferably use is made of an etching liquid containing $FeCl_3$. Preferably, the etching treatment is performed at a temperature between 30° C. and 75° C., for example, at 45° C. to 55° C., wherein 50° C. is a good value. The applied mask can be matched to the treatment to be performed. So, for example, for an etching treatment preferably a relatively hard mask is opted for, whereas for a blast treatment preferably a softer mask is opted for. As a hard mask, a mask can be applied on the basis of a UV-cured lacquer. As a soft mask, a mask can be applied which is obtained by air-drying from a water-based emulsion or dispersion of a lacquer, such as of an acrylate-based or acrylate-containing lacquer.

The use of masks which comprise an acrylate and/or the curing or post-curing of masks by means of infrared radiation as such forms an independent second aspect of the invention, wherein this second independent aspect relates to a method for manufacturing structured press elements, whether or not according to the first aspect or the preferred embodiments thereof, wherein the method comprises at least the following steps:

- providing an element of metal;
- providing a mask on a surface of the element for shielding portions of said surface;
- treating non-shielded portions of said surface of the element; and
- removing said mask;

with the characteristic that the step of providing the mask comprises at least a treatment with infrared radiation and/or that the mask is composed on the basis of an acrylate-based material. It is clear that this second aspect has preferred embodiments which correspond to the preferred embodiments of the first aspect, independently of the fact whether herein now an ultrasonic treatment is applied or not.

According to a particular embodiment of the first and the second aspect, the step of treating relates to a step in which the non-shielded portions of said surface are chemically treated, wherein this step of chemically treating is performed with said surface directed downward. Such manner of working prevents the forming of pools or films of saturated etching liquid or other chemically active product on the surface to be treated, by which the uniformity or efficiency of the chemical treatment will be lost. In that the surface to be treated is directed downward, the removed material and the active product, for example, the etching liquid, is removed in a simple manner. A fast drying of the surface is achieved. Facing the surface to be treated downward in an etching treatment as such forms an independent third aspect of the present invention, independently of the fact whether such method also shows the characteristics of the first and/or the second aspect. To this aim, the third aspect of the invention relates to a method for manufacturing structured press elements, whether or not according to the method of the first and/or the second aspect, wherein the method comprises at least the following steps:

- providing an element of metal;
- providing a mask on a surface of the element for shielding portions of said surface;

- chemically treating non-shielded portions of said surface of the element;
- removing said mask;

with the characteristic that the step of chemically treating is performed with said surface directed downward.

In the case that in one of said aspects, such as this is the case in the third aspect, the step of chemically treating is performed with said surface directed downward, the chemically active product preferably is provided on the surface to be treated by means of one or more spray heads. Herein, the element, or anyhow at least the surface thereof to be treated, thus preferably is not immersed in the respective chemically active product or etching liquid. Preferably, said spray heads are erected on one or more shuttles with a width smaller than the width of the surface to be treated, wherein these shuttles scan the respective surface at least by moving to and fro in said width over said surface, wherein each time a stripe extending over the width is treated, the mutual position between element and shuttle in length direction is adjusted, and another preferably adjacent stripe is treated. According to a variant, said spray heads are erected on one or more beams, which extend over the entire width of said element. In this manner, a treatment of the entire surface can be obtained in a single relative movement of the beam in respect to the press element. Preferably it is the beam which is moving. Independently of the arrangement of the spray heads, one or more or all of the spray heads preferably perform an oscillating movement transversely to the relative movement of spray head and surface to be treated; in other words, in the case of spray heads positioned on a shuttle, an oscillation transversely to the movement of the shuttle, and in the case of spray heads positioned on one or more beams, an oscillation transverse to the relative movement of beam and surface to be treated. Such oscillating movement creates an overlap between the zones treated by adjacent spray heads, or between the zones or stripes treated by successive movements of the shuttle. Such overlap prevents or minimizes a possible non-uniform treatment.

In the case of a chemical treatment, the step of chemically treating preferably is performed in at least two partial steps, wherein in a first step chemically active product is provided on said surface at a temperature of more than 35° C., for example, at approximately 45° C., and wherein in a second step chemically active product is provided on said surface at a temperature of less than 30° C., for example, at approximately 20° C. Preferably, first the highest temperature is applied and subsequently the lower temperature. Practically seen, such embodiment can be realized by means of two shuttles which are active one after the other, or by means of two beams, which are erected one behind the other. According to a variant, on the same shuttle, behind each other in the direction of movement, spray heads can be erected which apply chemically active product of different temperature. The inventors have found that applying at least two partial steps in which chemically active material of different temperature is provided on the surface of the element, leads to reduction of oxide formation and also to a somewhat sharper etched structure.

Preferably, residual products of said step of chemically treating are removed from the respective surface by means of a blowing device and/or rinsing device. Preferably, such removal is performed immediately after providing the chemically active product, for example, in that the blowing and/or rinsing device is mounted on said shuttle. With a rinse immediately after providing the chemically active product, for example, within 15 seconds, the formation of oxides is reduced. Namely, air can effect less long on the treated surface.

Preferably, said step of chemically treating is repeated several times, wherein per step, material is etched from the respective surface with a depth of preferably 20 to 120 micrometers. In that thin layers are etched away one after the other, a sharper image can be obtained. Herein, each step as such can consist of the also above-mentioned partial steps in which chemically active material of different temperatures is applied. Preferably, after each step residual products are removed from the respective surface, for example, by means of a blowing device.

It is clear that the press elements, which are manufactured according to the various aspects of the invention, preferably are applied in a method for manufacturing coated panels, wherein these panels are of the type comprising at least a substrate, a decor and a top layer on the basis of synthetic material, wherein the method comprises at least the following steps:

- realizing the respective press element with a method corresponding to one or more of the preceding aspects or the preferred embodiments thereof, wherein this press element, on its surface, is provided with a structure or relief;
- forming said coated panels, wherein said press element is applied for forming, by means of said relief, embossed parts in the decor side of the coated panels, and more particularly in the decor side of boards from which then such coated panels can be obtained.

Preferably, for the material of the press element of the invention metal, such as a steel alloy or a copper alloy, is applied.

When forming the coated panels, preferably use is made of the herein above also described DPL technique.

In a particularly preferred embodiment, the press element is provided with a relief showing the form of a wood structure.

It is clear that the application of the press elements of the present invention is not limited to the manufacture of coated panels which represent a wood structure or wood motif. The present invention can also be applied when the printed decor and the pertaining structure relates to a stone motif, a stone structure, respectively, or when this relates to fantasy motifs, fantasy structures, respectively.

The press elements manufactured according to the present invention moreover are particularly interesting when said decor represents a motif and when said relief and the motif of said decor match each other, such that said embossed parts in the decor side follow said motif at least partially or at least partially coincide therewith. Herein, this relates to embossed parts which, so to speak, are provided "in register" with the underlying motif of the, preferably printed, decor. This embodiment allows obtaining particularly convincing imitations of, for example, massive wood.

The present invention is in no way limited to the embodiments described herein above, on the contrary can such methods and press elements be realized according to various variants, without leaving the scope of the present invention.

The invention claimed is:

1. A method for manufacturing structured press elements, wherein the method comprises at least the following steps:
- providing an element of metal;
- providing a mask on a surface of the element for shielding portions of said surface;
- at least partially curing of the mask by ultraviolet sources or electron beam sources; and then
- further or completely curing of the mask by infrared radiation;
- chemically treating non-shielded portions of said surface of the element;
- removing said mask;
- wherein the method comprises the step of pretreating said surface before said mask is applied, in which said surface of the element is subjected to an ultrasonic treatment.

2. The method according to claim 1, wherein the step of removing said mask comprises subjecting said surface of the element to an ultrasonic treatment.

3. The method according to claim 1, wherein said mask is composed of an acrylate-based material.

4. The method according to claim 1, wherein the step of providing the mask is performed by a digital printing technique directly on the surface of said element.

5. The method according to claim 1, wherein the surface of the element is pre-formed by a milling and/or a laser treatment.

6. A method for manufacturing structured press elements, wherein the method comprises at least the following steps:
- providing an element of metal;
- providing a mask on a surface of the element for shielding portions of said surface;
- at least partially curing of the mask by ultraviolet sources or electron beam sources; and then
- further or completely curing of the mask by infrared radiation;
- treating non-shielded portions of said surface of the element;
- removing said mask;
- wherein the method comprises at least a step in which said surface of the element is subjected to an ultrasonic treatment.

7. The method according to claim 6, wherein the surface of the element is pre-formed by a milling and/or a laser treatment.

8. The method according to claim 6, wherein the step of treating non-shielded portions of said surface of the element, comprises at least two partial steps in which chemically active material is provided on the surface of the element.

9. The method according to claim 8, wherein in a first said partial step chemically active product is provided on said surface at a temperature of more than 35° C., and in a second said partial step chemically active product is provided on said surface at a temperature of less than 30° C.

10. The method according to claim 6, wherein said mask is composed of an acrylate-based material.

11. The method according to claim 6, wherein said ultrasonic treatment is performed in a bath, wherein said element is situated in an alkaline degreasing agent.

12. A method for manufacturing structured press elements, wherein the method comprises at least the following steps:
- providing an element of metal;
- providing a mask on a surface of the element for shielding portions of said surface;
- at least partially curing of the mask by ultraviolet sources or electron beam sources; and then
- further or completely curing of the mask by infrared radiation;
- treating non-shielded portions of said surface of the element;
- removing said mask;
- wherein the surface of the element is pre-formed by a milling and/or a laser treatment.

13. The method according to claim 12, wherein the step of treating non-shielded portions of said surface of the element, comprises at least a step in which chemically active material is provided on the surface of the element.

14. The method according to claim 13, wherein the step of treating non-shielded portions of said surface of the element, comprises at least two partial steps in which the chemically active material is provided on the surface of the element with a different temperature in each of said partial steps.

15. The method according to claim 14, wherein in a first said partial step chemically active product is provided on said surface at a temperature of more than 35° C., and in a second said partial step chemically active product is provided on said surface at a temperature of less than 30° C.

16. The method according to claim 12, wherein the method comprises the step of pretreating said surface before said mask is applied, in which said surface of the element is subjected to an ultrasonic treatment.

17. The method according to claim 12, wherein the step of removing said mask comprises subjecting said surface of the element to an ultrasonic treatment.

18. The method according to claim 12, wherein the step of treating non-shielded portions of said surface of the element, comprises at least two partial steps in which chemically active material is provided on the surface of the element; and wherein the method comprises at least a step in which said surface of the element is subjected to an ultrasonic treatment.

19. The method according to claim 18, wherein the step of removing said mask comprises subjecting said surface to said ultrasonic treatment and wherein the method further comprises the step of pretreating said surface before said mask is applied, in which said surface of the element is subjected to an ultrasonic treatment.

* * * * *